Aug. 6, 1929.   J. G. COFFIN   1,723,229
DISPENSING DEVICE
Filed Aug. 5, 1926   2 Sheets-Sheet 2
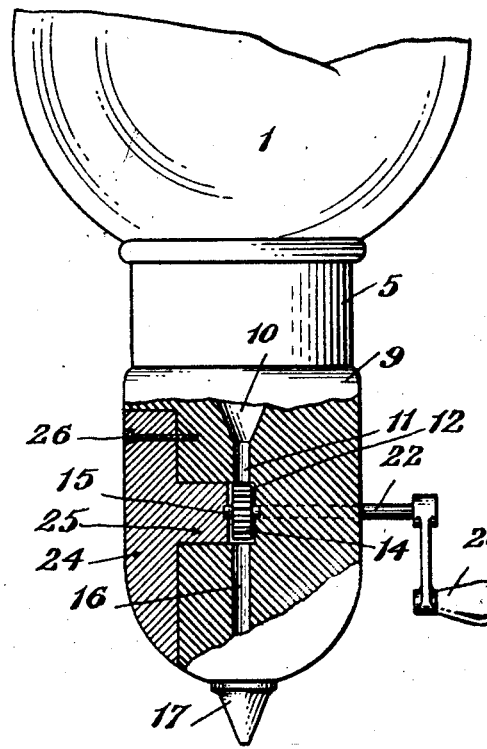
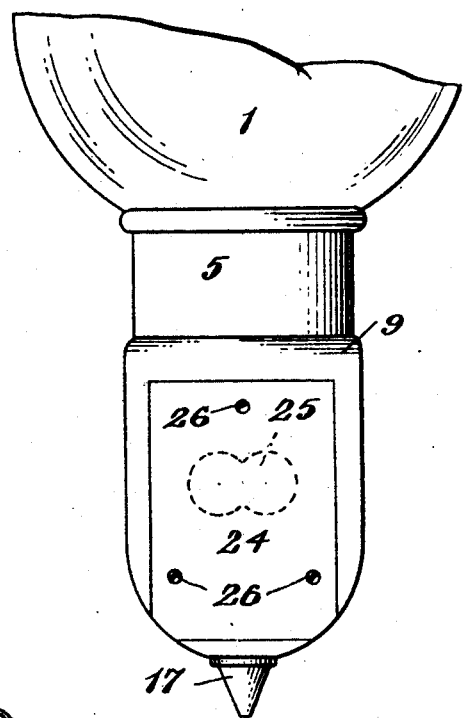
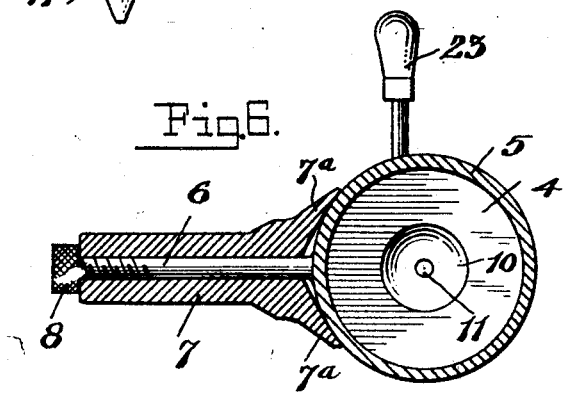
Inventor
Joseph G. Coffin
By his Attorney
Harry Radzinsky

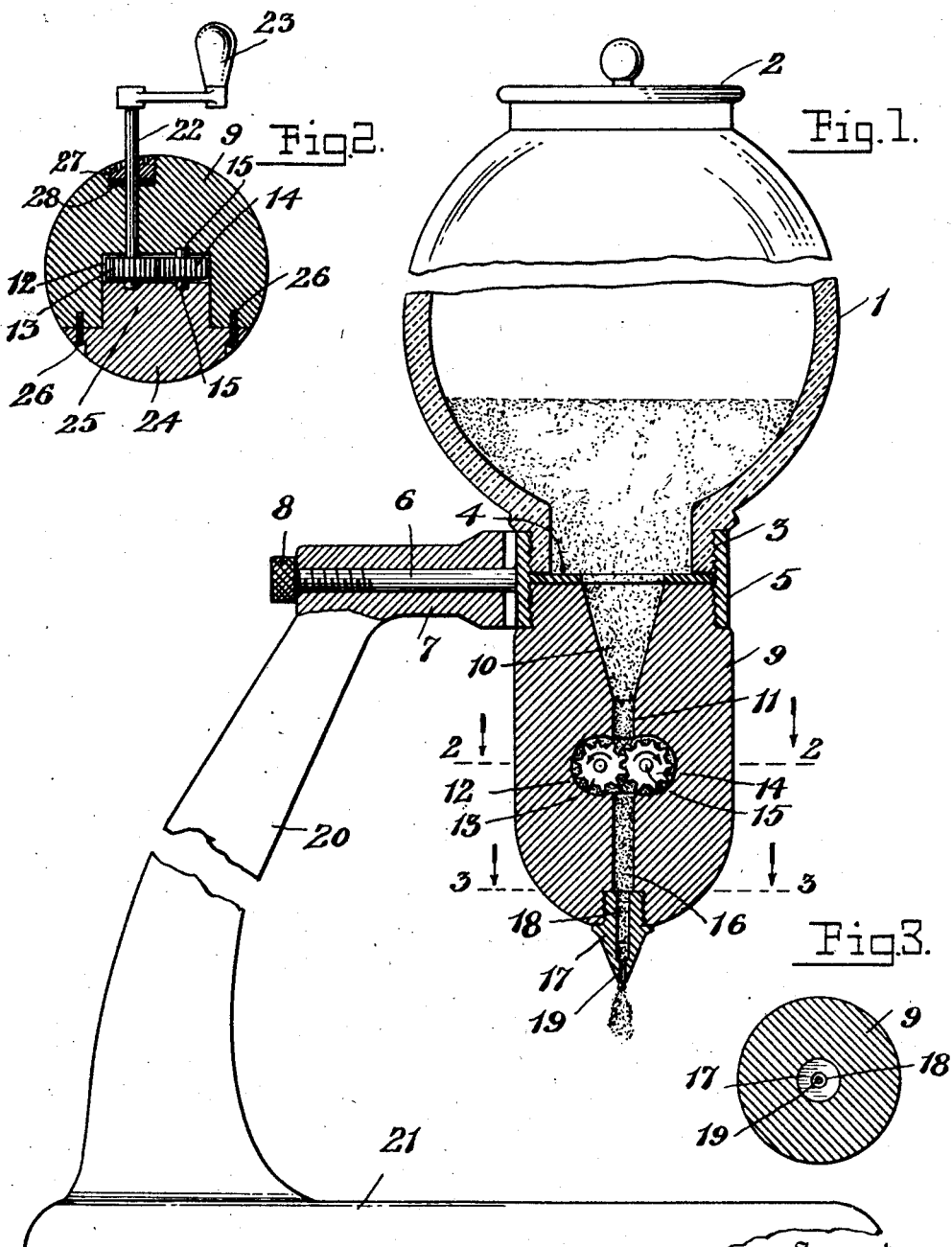

Patented Aug. 6, 1929.

1,723,229

UNITED STATES PATENT OFFICE.

JOSEPH G. COFFIN, OF NEW YORK, N. Y., ASSIGNOR TO MUSTOMATIK SPECIALTIES, INC., OF NEW YORK, N. Y., A CORPORATION OF NEW YORK.

DISPENSING DEVICE.

Application filed August 5, 1926. Serial No. 127,271.

This invention relates to a device for dispensing viscous substances, or any substances or materials which lack free flowing qualities or flow very sluggishly, such as mustard, mayonnaise, whipped cream, dental creams, liquid soaps and the like.

The object of this invention is to provide a dispensing device of the character mentioned, which will obviate the use of the insanitary containers which are in use at the present time. It is well known that in restaurants, refreshment stands and other places, mustard, mayonnaise, whipped cream and other semi-liquid or semi-solid food preparations or condiments are usually contained in open jars, dishes or other containers which permit the air to reach the contents and cause the substance to usually thicken or encrust about the mouth of the jar, at the same time permitting dirt, dust and insects to have free access to the contents. These conditions usually cause the type of container which is now in use to assume an encrusted, insanitary and unappetizing appearance.

The main object of my invention therefore, is to provide a container from which a desired or regulatable amount of mustard, mayonnaise or other substance can be dispensed when required and in which the contents of the container will be kept covered and retained in an entirely sanitary and clean condition, unaffected by air or other exterior conditions.

It is well understood that it is extremely difficult to dispense mustard, mayonnaise and other viscous or pasty substances in the small amounts required for use upon sandwiches, sausages, salads and the like, as these substances are extremely adherent and possess considerable viscosity, thus flowing very sluggishly. Through the use of my invention, however, a positive feeding means is provided, utilizing force or a pumping action, to force the substance out of the container in the proper amounts for application to an article of food or the like.

My improved device is economical in operation, saving considerable amounts of the dispensed product and incidentally saving the time of the user as it dispenses the substance accurately and in desired amounts. It feeds the dispensed substance in regulatable quantities without the use of such force as would cause the fed substance to spatter or splash and possibly cause damage to the clothing of the user.

My improved container is found particularly desirable and useful when it is used to contain food preparations such as mustard, whipped cream, mayonnaise and other pasty substances at restaurants and refreshment stands where sausages, sandwiches, salads and the like are sold, as it permits the substance which is dispenses to be directly applied in desired quantities to the foods, thus obviating the use of insanitary encrusted spoons, mustard sticks or the like.

With these objects and such other objects as may hereinafter appear, in view, I have devised the particular arrangement of parts hereinafter set forth and more definitely pointed out in the claims appended hereto.

Reference is to be had to the accompanying drawing in which

Figure 1 is a sectional view of my improved dispensing device disclosing in detail its operating parts;

Figure 2 is a sectional view on the line 2—2 of Figure 1, looking in the direction of the arrows;

Figure 3 is a sectional view on the line 3—3 of Figure 1 looking in the direction of the arrows;

Figure 4 is a front elevation of the lower part of my dispensing device, the parts of the valve chamber being shown in section to disclose construction;

Figure 5 is a side elevation of the part of the device shown in Figure 4, the view being taken at right angles to that shown in Figure 4; and Figure 6 is a cross-sectional view through the supporting annulus and the supporting bracket.

Throughout the various views of the drawings, similar reference characters designate similar parts.

In the accompanying drawing, 1 indicates the body of the container which holds a supply of mustard, mayonnaise, dental creams or any other substance. Said container may be made of glass, porcelain, china or of any other suitable material which is not affected by the mustard or such other contents as may be placed within it, and which will be entirely sanitary and can be readily washed or cleaned.

The body of the container may be of any desired shape and for the purposes of appearance, it is preferably made in more or less globular outline, having a top opening through which the container may be filled and which may be normally kept closed by the cover 2. Said cover should not be an absolutely tight fit so that the possibility of producing a vacuum within the chamber or container 1 is prevented.

At 3 is shown a supporting ring or annulus which is preferably made of metal and is internally threaded. The lower end of the container 1 is externally threaded so that it may be screwed into the ring or annulus 3 and down tight upon a washer 4 which rests upon the upper end of the valve-containing chamber 9. The valve-containing chamber 9 is also threaded at its upper end so that it may be screwed up into the annulus 5 and when the parts are held in their relations disclosed in Figure 1, an effective and tight joint is secured between the container 1 and the valve chamber 9. The annulus 5, which supports the container 1 and the valve chamber 9 is provided with a laterally-extending stud 6 which projects from the outer face of said annulus and this stud 6 extends through a boss 7 provided on the upper end of an arm or bracket 20, which extends upwardly from a supporting base 21, or may, if desired, be secured to a wall or other support. The stud 6 is provided with a threaded end to receive a knurled nut 8. The boss 7 is provided with projecting ends or wings 7a, which when the nut 8 is drawn up tight, bear securely against the periphery of the annulus 5 and very firmly and securely support it and its attendant parts.

It will be seen from the foregoing description that a construction is provided in which the various parts are readily removable or detachable from one another for cleaning or for other purposes. For instance, the container 1 may be readily threaded out of the annulus 5 without disturbing any of the other parts. The valve-containing chamber 9 can also be threaded out of the annulus 5 without disturbing the container 1 or if desired, by simply unthreading the nut 8, the annulus 5 with its attached containing chamber or reservoir 1 and valve-containing chamber 9, can be readily removed from the bracket 20.

Extending through the valve-containing chamber 9 is a continuous passage or bore which is composed of the portions designated at 10, 11, and 16. Said passage is in the nature of an outlet or discharge opening which leads through the lower end or opening in the container 1. At 10 is disclosed the upper part of the passage and the same is, in order to afford a free downward flow of the substance both by gravity and by the suction action of the dispensing gears to be referred to, made conical in shape and leads into the narrowed portion 11. At 12 is an enlarged opening which contains the valve mechanism, the same consisting of a pair of intermeshed gears 13 and 14. The opening 12, closely conforms in shape to the gears 13 and 14. The gear 14 is provided with stub axles 15 which extend into and rotate in complementary recesses provided in the body of the chamber for them. The gear 13 is the manually rotated gear and the same is provided with a shaft 22, which extends out through one side of the valve-containing chamber 9 and terminates in the crank handle 23, by which manual rotation of said gear is effected.

It will be seen that manual rotation of said gear 13 by the crank 23 in the direction of the arrow disclosed in Figure 1 will cause the gear 14 to be driven in an opposite direction, and as will be hereinafter explained, this will cause the mustard or other substance to be forced out of the discharge opening 16 through a nozzle 17 which is provided with a bore 18 and another reduced bore 19. The nozzle 17 just described is threaded into the lower end of the valve-containing chamber 9 so that its enlarged bore 18 is located in direct alignment with the passage 16 in said chamber, and forms a substantial continuation of the same.

To provide a tight joint about the shaft 22, a packing gland is provided, the same consisting of the washer 28 held in position by a threaded plug 27. For the purpose of enabling the gears 13 and 14 to be placed in their respective positions or removed when the same become worn, the body of the valve-containing chamber 9 is preferably provided with a removable part indicated at 24, the same being provided with a narrowed plug portion 25 which conforms in shape to the opening 12. Screws 26 unite the part 24 with the body of the valve-containing chamber as is clearly disclosed in Figures 4 and 5.

From the foregoing, the manner in which my improved device may be used will be readily understood. The substance contained within the chamber or reservoir 1 descends downwardly, partly through the force of gravity and partly by the suction action of the gears, into the conical passage 10, through the passage 11 and down upon the meshed gears 13 and 14, the point of intermesh of these gears being located in substantial alignment with the passage 11. As these gears are rotated in the direction of the arrows disclosed in Figure 1 by manual operation of the crank handle 23, they will carry between their teeth some of the substance that has been drawn down on them by the suction action of the gears through the passage 11. This is carried until the lower part of the gears is reached and to the point of intermesh where the substance carried by the gears is forced down through the passage 11; thence through the passage 18 in the nozzle, and finally through the narrowed outlet opening 19 and directly onto any article of food or the like which may be held underneath the nozzle 17.

The amount of substance fed by the device is readily regulatable by rotation of the crank 23, as a half turn of the crank will give a certain amount of the substance, and one, two or three turns giving an increased amount, so that a pre-determined amount of the substance can be fed as required. The nozzle 17 is readily removable for cleaning purposes and nozzles having smaller or larger discharge openings 19 or of different designs to suit the particular substance being dispensed, may be substituted if desired. Since the valve mechanism utilized, consisting of the gears 13 and 14, is a positive suction and force feed, my device is extremely effective for use in dispensing pasty, sluggishly flowing substances.

From the foregoing, it is obvious that my invention is not to be restricted to the exact embodiment shown, but is broad enough to cover all structures coming within the scope of the annexed claims.

Having described my invention, what I claim is:

1. A device for dispensing viscous substances having the substantial viscosity of mustard, mayonnaise, shaving cream or the like, consisting of a container, a ring or annulus for holding the same, an actuating unit removably received and held by said ring, said container having a top opening, and a lower outlet opening through which the contents of the container are received into the actuating unit partly by gravity and by suction created by the action of said unit, said unit consisting of several co-operating rotatable members for sucking in the substance and rejecting the same through an opening disposed in said unit in regulatable quantities directly upon an article intended to receive such substance.

2. A dispensing device for mustard and like substances, comprising a bracket adapted to be supported on a table, counter or like support, an annulus held on said bracket, a reservoir held in the upper portion of said annulus, a valve chamber held in the lower portion of said annulus below the reservoir, said valve chamber having a passage extending through it and in alignment with an opening in the reservoir, rotary feeding means located in said passage, and manual means for operating said rotary feeding means to discharge reservoir contents out through the passage.

Signed at the city, county and State of New York, this 3rd day of August, 1926.

JOSEPH G. COFFIN.